(12) United States Patent
van der Klift et al.

(10) Patent No.: US 9,448,565 B2
(45) Date of Patent: Sep. 20, 2016

(54) SAFETY DEVICE FOR INSTALLATION IN A GAS-SUPPLY SYSTEM, IN PARTICULAR, AN ACETYLENE-SUPPLY SYSTEM

(71) Applicant: Spectron Gas Control Systems GmbH, Frankfurt (DE)

(72) Inventors: Johan van der Klift, Eppstein-Vockenhausen (DE); Andreas Roncka, Gernsheim (DE)

(73) Assignee: Spectron Gas Control Systems GmbH, Frankfurt (DE)

( * ) Notice: Subject to any disclaimer, the term of this patent is extended or adjusted under 35 U.S.C. 154(b) by 47 days.

(21) Appl. No.: 14/260,691

(22) Filed: Apr. 24, 2014

(65) Prior Publication Data

US 2014/0318642 A1    Oct. 30, 2014

(30) Foreign Application Priority Data

Apr. 25, 2013    (DE) .................. 10 2013 104 220

(51) Int. Cl.
*G05D 16/16*    (2006.01)
*G05D 16/04*    (2006.01)
(Continued)

(52) U.S. Cl.
CPC .............. *G05D 16/04* (2013.01); *F16K 1/304* (2013.01); *F16K 17/025* (2013.01);
(Continued)

(58) Field of Classification Search
CPC ... G05D 16/16; G05D 16/163; G05D 16/166
USPC ....... 137/505.13, 505.22, 505.25, 488–492.5
See application file for complete search history.

(56) References Cited

U.S. PATENT DOCUMENTS 2,982,297 A * 5/1961 Modes ............... G05D 16/0655
137/271
3,286,726 A * 11/1966 Guy .................... G05D 16/0663
137/505.18
(Continued)

FOREIGN PATENT DOCUMENTS

DE    20 01 954 A1    7/1971
DE    43 08 801 C2    10/1995
(Continued)

OTHER PUBLICATIONS

Espacenet English language abstract of DE 43 08 801 C2, published Oct. 19, 1995.
(Continued)

*Primary Examiner* — Kevin Murphy
*Assistant Examiner* — Paul Gray
(74) *Attorney, Agent, or Firm* — Tiajoloff & Kelly LLP

(57) ABSTRACT

Relevant specifications in the field of gas supply provide for different safety devices for installation in a gas-supply system, in particular, an acetylene-supply system. To provide such a safety device, which is characterized by a compact structure and a high level of operational reliability, this invention proposes that a valve body (1) incorporates an over-pressure valve (4; 104) of a quick-action shut-off device, a control valve (3; 103) of a pressure-limiting device, and a safety valve (2; 102), whereby the safety valve (2; 102) can be fluidically connected to the over-pressure valve (4; 104) and the control valve (3; 103), and closes either when the over-pressure valve (4; 104) opens due to an inlet pressure that is above the inlet-pressure limit value or when the control valve (3; 103) opens due to an outlet pressure that is above an outlet-pressure limit value.

14 Claims, 5 Drawing Sheets

Figure 1:
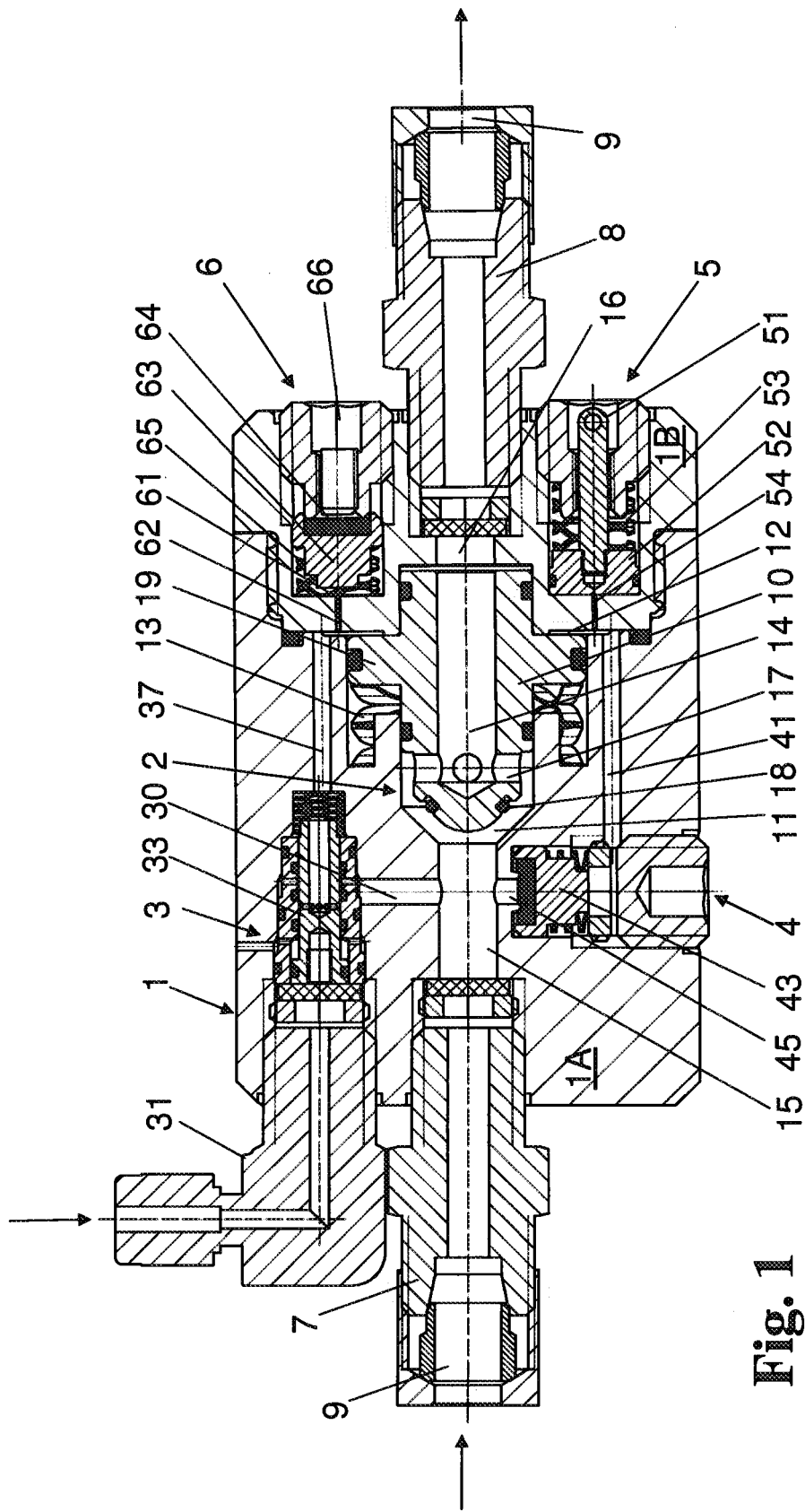

(51) Int. Cl.
*F16K 17/168* (2006.01)
*F17C 13/04* (2006.01)
*G05D 16/18* (2006.01)
*F16K 17/04* (2006.01)
*F16K 17/06* (2006.01)
*F16K 1/30* (2006.01)
*F16K 17/10* (2006.01)
*F16K 17/02* (2006.01)

(52) U.S. Cl.
CPC ............ *F16K 17/048* (2013.01); *F16K 17/06* (2013.01); *F16K 17/10* (2013.01); *F16K 17/168* (2013.01); *F17C 13/04* (2013.01); *G05D 16/18* (2013.01); *F17C 2205/0332* (2013.01); *F17C 2205/0382* (2013.01); *F17C 2205/0385* (2013.01); *Y10T 137/7794* (2015.04); *Y10T 137/7922* (2015.04); *Y10T 137/877* (2015.04); *Y10T 137/87756* (2015.04)

(56) References Cited

U.S. PATENT DOCUMENTS

| | | | | |
|---|---|---|---|---|
| 3,568,706 | A | * | 3/1971 | Weise ............... F16K 15/025 137/112 |
| 3,825,026 | A | | 7/1974 | Salerno et al. |
| 4,325,406 | A | * | 4/1982 | Bron ............... G05D 16/166 137/492.5 |
| 5,222,518 | A | * | 6/1993 | Fisher ............... G05D 16/163 137/460 |
| 2008/0035221 | A1 | | 2/2008 | Gawryjolek |

FOREIGN PATENT DOCUMENTS

GB  2342416 B  10/2002
WO  2006011023 A1  2/2006

OTHER PUBLICATIONS

Espacenet English language abstract of DE 20 01 954 A1, published Jul. 22, 1971.

* cited by examiner

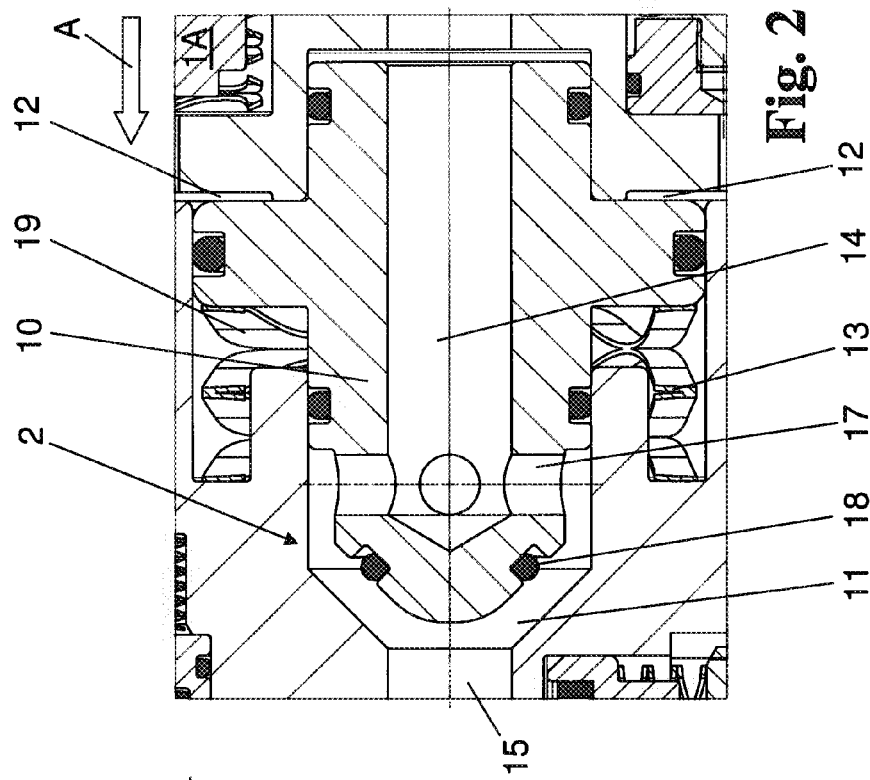
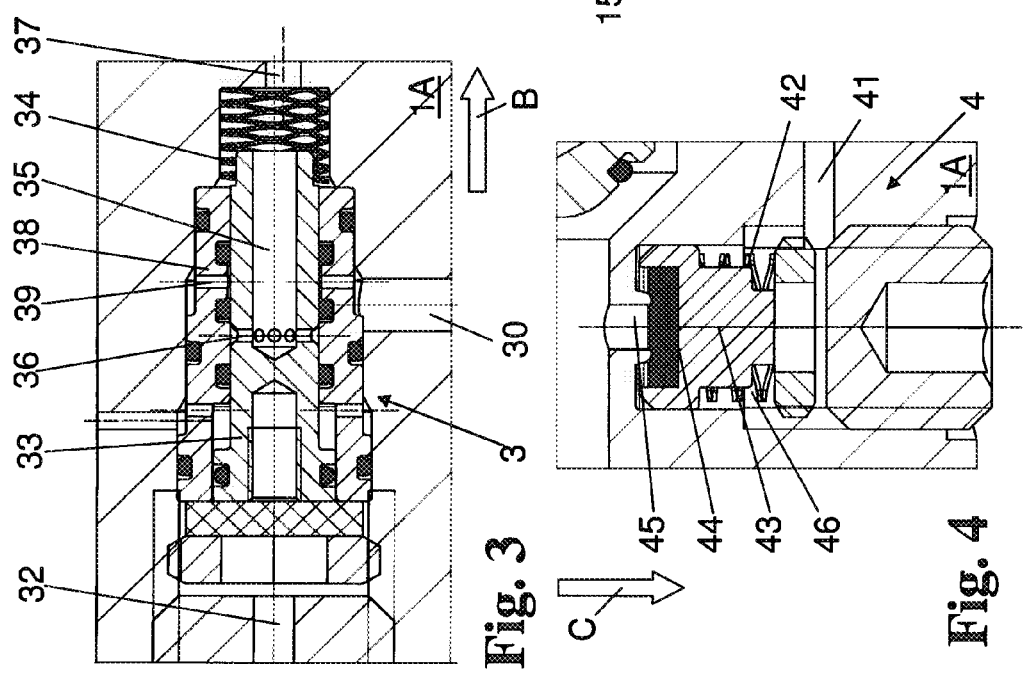

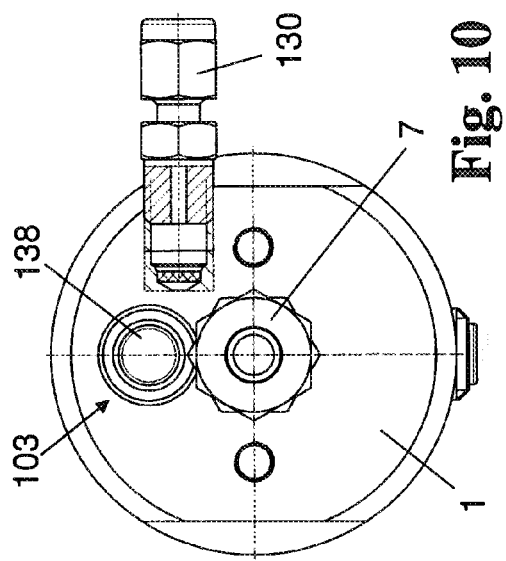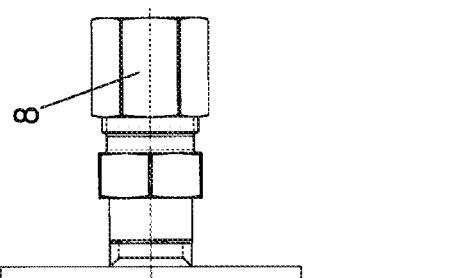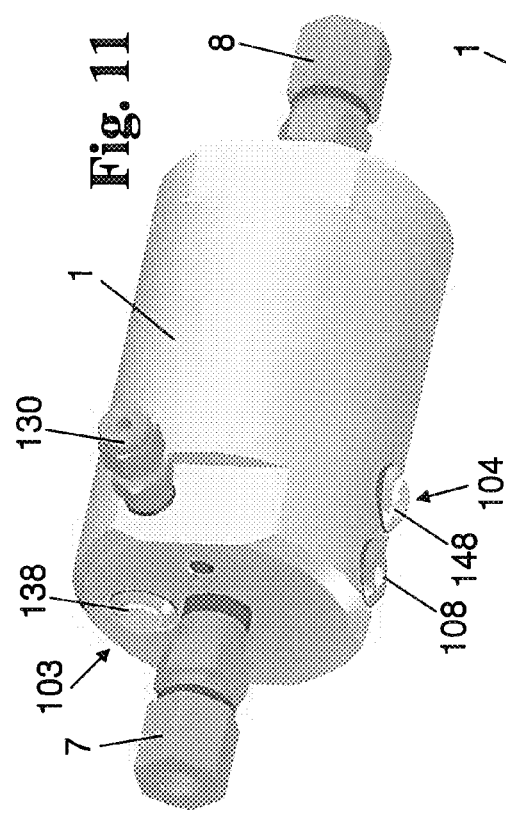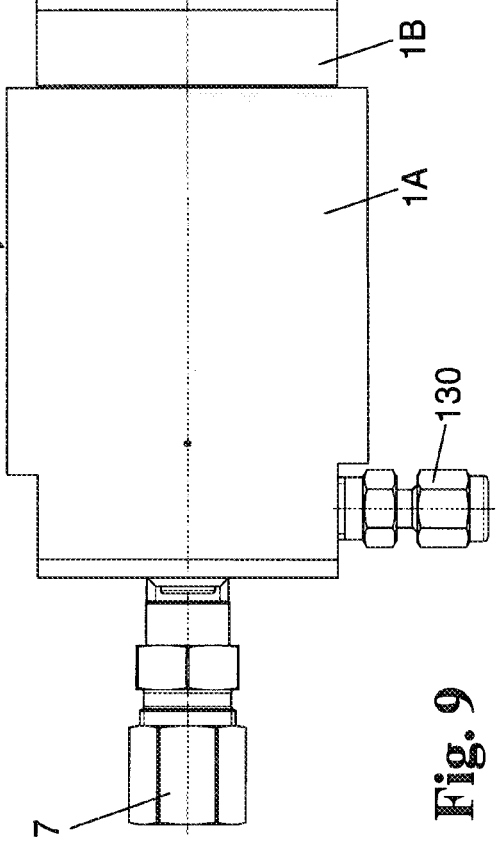

SAFETY DEVICE FOR INSTALLATION IN A GAS-SUPPLY SYSTEM, IN PARTICULAR, AN ACETYLENE-SUPPLY SYSTEM

TECHNICAL BACKGROUND

The invention refers to a safety device for installation in a gas-supply system, in particular, an acetylene-supply system, where a main pressure regulator relieves gas fed in at inlet pressure to outlet pressure.

In its simplest form, the gas-supply system can be a gas cylinder, a tank or another type of container. Several containers can also be connected to one another, so when one container becomes empty, the system is able to switch to a different container which is still full.

The gas-supply system feeds the gas to a tapping point. The gas to be tapped is pressurized and in this respect already represents a certain hazard potential for users and the environment. In principle, the safety device is suitable for installation in all gas-supply systems of this type. However, it has a particularly beneficial effect when used with combustible or toxic gases, such as methane, propane, natural gas, hydrogen, liquid gas, carbon monoxide, halogens and suchlike, and especially with acetylene-gas-supply systems.

Acetylene ($C_2H_2$) is known for being highly flammable and, at high temperature or pressure, decomposes into its elements suddenly if heated. Depending on the circumstances, this decomposition may have a detonating effect, thus endangering people, the surroundings, and the system. Therefore, the maximum operating pressure (outlet pressure) in acetylene extraction lines is usually limited to 1.5 bar of over-pressure. In addition, various safety devices are provided in fittings or piping. These devices are defined, for example, for acetylene systems in general in TRAC 207 (Technische Regeln für Acetylenanlagen und Calciumcarbidlager, "technical rules for acetylene systems and calcium-carbide stores") and for acetylene manifold systems specifically in standard EN ISO 14114:1999 (Acetylene manifold systems for welding, cutting and allied processes—General requirements).

Safety devices on the inlet-pressure side feature manual or automatic quick-action shut-off devices as per EN ISO 14114:1999, Section 3.6, gas non-return valves, and flashback arrestors. Gas non-return valves prevent the acetylene from flowing back, while flashback arrestors cool down and hold back hot decomposition fumes.

Quick-action shut-off devices are installed in particular in piping or fittings on the inlet-pressure side of the manifold system and shut this off manually or automatically in the event of acetylene decomposition in order to stop the spread of said decomposition even before the main pressure regulator is reached, preventing it from getting through to the outlet-pressure side of the pressure regulator. In line systems where explosions may be expected to start from two sides, such quick-action shut-off devices must be designed in duplicate for both sides accordingly. They are also known as decomposition arrestors and must even be capable of withstanding potential acetylene decomposition when there is a detonative effect, where pressures of over 100 MPa (1000 bar) can occur.

PRIOR ART

The safety devices are installed at a suitable position in supply lines or fittings. DE 43 08 801 C2, for example, describes an acetylene-supply system composed of cylinder bundles, which are connected to one another by means of a computer-controlled pneumatic switchover system. A quick-action valve and a purge valve are fitted on the inlet-pressure side of the line system, that is, upstream of the main pressure regulator, along with a decomposition arrestor directly upstream of the tapping point.

There are no construction details provided for these safety devices. If the pressure rises above a predefined level, acetylene gas can be discharged into the open through the purge valve. However, the discharge of acetylene to a secure location is still associated with danger and environmental pollution; therefore, it is fundamentally undesirable (EN ISO 14114:1999, Section 4.1.1.f).

A quick-action valve for installation in the high-pressure line of an acetylene bundle system is already familiar from DE-AS 20 01 954; in the event of an explosion, this valve works as a gas seal and a flashback arrestor simultaneously. It consists of a housing with an internal hole, in which there is a cylinder that permits movement in the axial direction and is fixed on a steel wire; if the valve is open, the acetylene gas flows around this cylinder. The pressure wave of an explosion causes the cylinder, due to the deformation of the support wire, to press against a sealing point of the internal hole, for example, against a conical wall made of lead, thus closing the internal hole. The flashback arrestor, which is located after the seal in the direction of flow, consists of a steel-wool plug fixed in the housing's internal hole.

The quick-action valve does have a simple construction, but it also comes with disadvantages, one being that the closing behavior cannot be reliably reproduced and another that the valve is destroyed when used and has to be removed and replaced before the gas-supply equipment can be operated again.

Another basic problem associated with reliably supplying acetylene gas is that the pressure regulator's outlet pressure is subject to a certain degree of uncertainty too. This uncertainty is based, for example, on the possibility of a gradual increase in pressure due to a deviation or a sudden pressure increase caused by a controller defect. In order to prevent this, EN ISO 14114:1999, Section 3.7, recommends that a "pressure-limiting device" be used.

A pressure regulator taking the form of a gas-cylinder valve cap, which fulfills this function, is already familiar from GB 2 342 416 B. To this end a housing is provided, in which a valve piston is positioned on bearings between a front and rear seal that permit movement in the axial direction. The valve piston has a front end facing the gas cylinder with a small cross-sectional area and an opposite end with a larger cross-sectional area, which a spiral spring rests against and which protrudes into a pressure chamber sealed off by the rear seal, which a gas inlet opens into.

The inlet pressure applied at the gas-cylinder outlet against the smaller effective cross-section is sufficient to lift the piston valve off the front seal against the pressure of the spiral spring in order to enable gas to be tapped from the gas cylinder. Some of the tapped gas is fed back via a bypass to the pressure chamber through its gas inlet at an outlet pressure set on the pressure regulator. The rear end of the valve piston protrudes into this chamber. As the outlet pressure rises, the pressure on the rear, larger cross-sectional area of the valve piston increases until this pressure, combined with the spring force of the spiral spring, is sufficient to press the valve piston against the front seal, thus stopping gas being tapped any further.

In this way the actual outlet pressure applied is regulated and limited in relation to the inlet pressure. However, the valve is only held in its closed position by means of the, although increased, outlet pressure. If the inlet pressure rises, for example, due to an acetylene decomposition reaction, there is a risk of the valve opening and destroying the pressure-limiting device as a result.

Object to be Solved

The object which this invention aims to solve is to provide a safety device for a gas-supply system, in particular, an acetylene-supply system, which is characterized by a compact structure and a high level of operational reliability, and which avoids the disadvantages explained above that are associated with known equipment.

SUMMARY

The invention solves this task by providing a safety device which comprises a valve body incorporating an over-pressure valve of a quick-action shut-off device, a control valve of a pressure-limiting device, and a safety valve, whereby the safety valve can be fluidically connected to the over-pressure valve and the control valve, and closes either when the over-pressure valve opens due to an inlet pressure that is above an inlet pressure limit value or when the control valve opens due to an outlet pressure that is above an outlet-pressure limit value.

The safety device represented by this invention comprises an automatic quick-action shut-off device and an automatic pressure-limiting device. In contrast to the state of the art, however, these functions are not provided in different places within the gas-supply system's line system; rather, they are realized in a single fitting, which is designed for installation in the high-pressure area.

In order to combine the quick-action shut-off device and the pressure-limiting device, both functions have been developed inside a single shared valve housing, which is essentially manufactured as a monolithic, multiple-part block, for example. On the other hand, the functions themselves have been designed as valves, namely, as an over-pressure valve and a control valve, with these valves in turn being connected to a safety valve, which serves as a joint shut-off valve for both functions. The safety valve shuts off the supply line and, consequently, any further gas supply as soon as either the over-pressure valve or the control valve opens. Therefore, it ideally fulfills the specifications for a pressure-controlled shut-off valve as per EN ISO 14114: 1999, Annex B.

The over-pressure valve opens if the inlet pressure (operating pressure) exceeds a predefined limit value. The limit value can be adjusted or is preset at the factory. It may be, for example, 1.2 times the standard maximum cylinder or line pressure, for instance, 30 bar. If this value is exceeded, a major defect must be expected, involving acetylene decomposition, for example, and the gas-supply line is closed automatically. As such, this function fulfills the standard specifications for an automatic quick-action shut-off device (EN ISO 1411:1999, Section 3.6.2).

The control valve opens if the outlet pressure exceeds a predefined limit value. The outlet pressure is the operating pressure for gas tapping, which is set by the main gas-flow-rate controller. To this end, the control valve features a gas inlet at which the outlet pressure is applied. This limit value too can be adjusted or is preset at the factory. It may be, for example, 1.2 times the standard target value for the operating pressure, for instance, 1.8 bar at a target operating pressure of 1.5 bar. As such, this function fulfills the standard specifications for a pressure-limiting device as per EN ISO 14114:1999, Section 3.7.

In normal operation the over-pressure valve and control valve are closed; the safety valve is open and allows gas to flow unimpeded. The over-pressure valve and control valve are both fluidically connected to the safety valve. In this context a "fluidic connection" is understood to mean that, if a connection is open, there will be full or extensive pressure compensation between the pressurized areas which are fluidically connected, irrespective of whether these pressurized areas are connected to one another directly—via a single shared connection line—or indirectly—via several connected lines, cavities or pressurized areas.

The interaction between the different valves and functions inside a single fitting enables the valve housing to benefit from a compact design. If this safety device is installed, there is no need for a relief valve or overflow valve either.

A preferred embodiment of the safety device invention is for the safety valve to feature an inlet-pressure gas inlet, an inlet-pressure gas outlet, and, between the gas inlet and gas outlet, a safety-valve chamber. This chamber can be closed via a safety-valve closing element, ideally a safety-valve piston that permits movement inside the chamber in an axial direction and opens with the inlet pressure. The chamber can be divided into a front pressure chamber and a rear pressure chamber, whereby the safety-valve closing element, ideally the safety-valve piston, protrudes into the front pressure chamber facing the inlet-pressure gas inlet with a first, smaller effective cross-section, and whereby the safety-valve closing element, ideally the safety-valve piston, protrudes into the rear pressure chamber facing the inlet-pressure gas outlet with a second, larger effective cross-section, and whereby the rear pressure chamber and the front pressure chamber can both be fluidically connected to the overpressure valve and the control valve via pressure-compensation lines.

The gas is transferred via the safety valve, which to this end features a gas inlet and a gas outlet, whereby the gas at each is at inlet pressure. The closing element that permits movement in the axial direction inside the safety-valve chamber—for example, the safety-valve piston—opens with the inlet pressure applied at the gas inlet and, in normal operation, allows gas to flow from the gas inlet to the gas outlet unimpeded.

The safety-valve chamber is divided into a front pressure chamber and a rear pressure chamber by the closing element (referred to hereafter as the "piston"). It is important that the effective cross-section for the gas pressure acting on the piston is smaller in the front pressure chamber than in the rear pressure chamber. This difference in the effective cross-section means that the safety-valve piston is brought into its closed position at the latest when the pressure in the rear pressure chamber is at the same level as the pressure in the front pressure chamber. This interrupts any further gas supply. Ideally, the safety valve is designed as a piston valve. However, it can also feature a different closing element that is equivalent to the piston, for example, a diaphragm.

The safety-valve piston ideally features a cavity and a piston wall sealed off from the safety-valve chamber area by area, whereby the cavity has at least one cross hole that extends through the piston wall and into an area which is connected to the front pressure chamber when the safety valve is open and is sealed off from the front pressure chamber when the safety valve is closed.

The safety-valve piston which is able to move against the spring force in the axial direction inside the safety-valve chamber features a cavity at its rear end. This cavity has one or more cross holes, which open into the front pressure chamber if the safety valve is open. If the safety valve is closed, these through holes are sealed off from the front pressure chamber.

Both the front and the rear pressure chamber can be fluidically—i.e., directly or indirectly—connected to the over-pressure valve and the control valve via pressure-compensation lines. The pressure-compensation lines are pressurized if the respective valve (over-pressure valve/control valve) is open. Ideally, if the valve is open, the respective pressure-compensation lines are pressurized with the inlet pressure prevailing at the inlet-pressure gas inlet, so the rear pressure chamber of the safety-valve chamber is then pressurized with this inlet pressure too and the safety valve closes accordingly.

To this end, the control valve is connected to the safety valve via a pressure-compensation line, through which gas flows into the control valve at inlet pressure when the control valve is open and the open safety valve closes.

If the control valve is open, gas flows into the control valve at inlet pressure through this pressure-compensation line and from there continues through the other pressure-compensation line into the rear pressure chamber of the safety valve, which then closes. This happens as explained above in the description of the safety valve, that is, because the effective cross-section for the gas pressure acting on the safety-valve piston is larger in the rear pressure chamber than in the front pressure chamber. This difference in the effective cross-section causes the safety-valve piston to always be brought into and held in the closed position when the pressures in the two pressure chambers are at the same level. The inlet pressure always acts as the holding force here, never the outlet pressure.

Since the control valve of the pressure-limiting device is to open if there is an excessively high outlet pressure, it must be connected to a gas source in which the outlet pressure is applied. A tried-and-tested configuration in this context is for the control valve to feature an outlet-pressure gas inlet for the gas, which is connected to a control-valve chamber closed against the outlet-pressure gas inlet up to the predefined outlet-pressure limit value by means of a control-valve closing element, ideally a control-valve piston, which permits movement inside the chamber in an axial direction, whereby when the control valve is open, the pressure-compensation lines are open and fluidically connect the control-valve chamber to the front pressure chamber and the rear pressure chamber.

This connection ensures, for example, a preferred embodiment of the safety device invention, in which the control-valve piston features a cavity and a piston wall sealed off from the control-valve chamber area by area, whereby the cavity is fluidically connected to the rear pressure chamber and has at least one cross hole that extends through the piston wall and into an area which is sealed off when the control valve is closed and is fluidically connected to the front pressure chamber when the control valve is open.

The control-valve piston which is able to move against the spring force in the axial direction inside the control-valve chamber features a cavity at its rear end, which is in turn connected to the rear safety-valve pressure chamber via a pressure-compensation line. In addition, one or more cross holes through the piston wall are provided in the cavity. If the control valve is closed, the cross hole designed as a through hole opens into an area of the piston outer wall which is sealed to the outside, for example, between sealing rings fitted above and below the through hole. However, if the control valve is open—that is, if the outlet pressure is above the limit value—this through hole opens into an area of the piston outer wall which is connected to the front pressure chamber of the safety-valve chamber via the pressure-compensation line.

If the control valve is open, gas flows into the cavity of the control-valve piston at inlet pressure via this fluidic connection and from there continues through the other pressure-compensation line into the rear pressure chamber of the safety-valve chamber, which causes the safety valve to close immediately.

The control-valve chamber and the control-valve piston are designed advantageously such that when the control valve is in the open position, a pressure acting in the closing direction has a larger effective cross-section than the pressure acting in the opening direction.

The fact that the total forces acting on the control-valve piston in the closing direction are greater than the forces acting in the opening direction ensures that the control valve is closed again immediately as soon as the open position is reached. The gas which is at inlet pressure and applied at the through hole of the piston may have to be enclosed to this end, which can also be achieved by means of seals above and below the through hole once it has occupied its valve open position. One of the forces acting on the control-valve piston in the closing direction is the restoring force of a spring and the back pressure from the rear pressure chamber, which also corresponds to the inlet pressure, whose effect on the control-valve piston can however be increased by a comparatively larger effective cross-section.

The control valve is also preferably designed as a piston valve. However, it can also feature a different closing element that is equivalent to the piston, for example, a diaphragm.

In terms of the over-pressure valve of the quick-action shut-off device, a tried-and-tested configuration is for it to feature an over-pressure chamber connected to the inlet-pressure gas inlet. This chamber has an over-pressure-chamber opening, which is closed by means of a closing element that is able to move in the axial direction and is fluidically connected to the rear pressure chamber via a pressure-compensation line.

At the over-pressure valve—unlike the control valve—the supply pressure corresponds to the inlet pressure actually prevailing at the inlet-pressure gas inlet and in the front pressure chamber. This is also applied at the valve opening of the overpressure chamber, for example, via a pressure-compensation line fluidically connected to the front pressure chamber. A spring provided in the over-pressure chamber defines the minimum pressure force above which the closing element is moved in the axial direction and releases the valve opening. At a target inlet pressure of up to 25 bar, such as is standard for acetylene containers, for example, the minimum pressure is around 30 bar, for instance.

If the over-pressure valve is open, gas flows at the current inlet pressure to the rear pressure chamber through the pressure-compensation line provided for this purpose. This moves the safety-valve piston, as described above based on the control valve, into the closed position and any further gas supply is stopped immediately. No discharge of the gas from the over-pressure valve into the open is provided for; the overpressure chamber is closed—with the exception of the pressure-compensation line mentioned and any gas discharge lines to a display instrument or similar.

Ideally, the closing element is pressed against the over-pressure-chamber opening by means of a spring located in the over-pressure chamber; this element has a larger effective pressure cross-section on its side facing the over-pressure chamber than on its opposite side.

The spring force and the difference in the effective cross-section results in a force which acts explicitly on the closing element in the closing direction. This ensures that the over-pressure valve is only open temporarily, for around as long as it takes to perform pressure compensation with the rear pressure chamber. The safety valve then closes so a pressure at approximately the same level as the inlet-pressure limit value or higher remains in the over-pressure chamber.

The pressure thus remaining in the over-pressure chamber acts together with the spring on the closing element in the closing direction and prevents the over-pressure valve from opening again, or makes this process difficult.

In the event that a safety valve which has already been activated, i.e., closed causes a further pressure rise in the inlet-pressure line, however, the over-pressure valve must be opened again in the interests of ensuring a reliably closed safety valve.

To this end a tried-and-tested configuration is for the over-pressure valve and the safety valve to be coordinated with one another such that, if the safety valve is closed, the forces acting on the safety-valve piston in the closing direction are greater than the forces acting on the closing element in the closing direction.

If the over-pressure valve opens again, the pressure applied in the rear pressure chamber and acting on the safety-valve piston in the closing direction also increases, thus guaranteeing that the safety valve cannot open.

If the safety valve has been activated, i.e., the gas supply has been unavoidably interrupted due to the limit value for the outlet pressure being exceeded or the limit value for the inlet pressure being exceeded, the rear pressure chamber is subject to over-pressure. It contains gas and, if acetylene is used, may contain a proportion of gaseous acetylene decomposition products. It is not possible to continue using the safety device in this condition; it must be removed or—ideally—vented.

A particularly advantageous embodiment of the safety device invention is provided for this purpose, where the valve body incorporates a vent valve. This valve in turn features a vent-valve chamber, which is closed via a closing element that can be mechanically actuated and, thus, moved in the axial direction, and is fluidically connected to the rear pressure chamber via a pressure-compensation line.

The fault which caused the safety valve to be activated must be rectified. Irrespective of whether the fault came from an increased outlet pressure or an increased inlet pressure, the valve opened as a result (control valve/over-pressure valve) automatically returns to its initial position—that is, the closed position. Therefore, the vent-valve chamber can be opened safely by moving the closing element, so gas subject to over-pressure is able to discharge from the vent-valve chamber, as well as from all lines and cavities fluidically connected to it, and from the rear pressure chamber in particular. The gas flow being discharged depends on the over-pressure of the gas and the volume filled with gas and can be very low.

Thanks to the pressure reduction in the rear pressure chamber, the safety-valve piston moves back to its initial position due to the gas pressure applied in the front pressure chamber—ideally assisted by a spring located in the safety-valve chamber. The safety valve is thus open again and ready for operation. Provided that maintenance has been performed and indicates that the safety device is undamaged, it does not need to be removed.

The pressure in the vent-valve chamber can reach up to 1000 bar. A high pressure makes it difficult to actuate the closing element. A tried-and-tested configuration in this context is for the closing element to be moved by means of a threaded bolt, which can be screwed in or out easily even at a high pressure force. However, it may be necessary to ensure that the vent valve is closed again prior to recommissioning by loosening the threaded bolt.

To enable a user to identify that a fault is present straightaway, a preferred embodiment of the safety device features a valve body incorporating a display instrument, which has a hole containing an inspection element positioned on bearings that permit movement in the axial direction. This element seals the hole and allows for a display pressure chamber at the base of the hole; this chamber is fluidically connected to the rear pressure chamber via a pressure line.

When the safety valve is activated—due to whatever cause—the rear pressure chamber is subjected to over-pressure, which is propagated via the pressure line into the display pressure chamber at the base of the display element's hole. This causes the display element—ideally working against the force of a return spring—to be partially pushed out of the hole, making it easily identifiable (due to its signal color too, for example). Once the fault has been rectified and any ventilation carried out, the display element can be sunk into the hole again or moved there automatically by means of the return spring.

As regards a particularly high level of operational reliability and reliability of the safety device, it has proved beneficial for the control valve and/or the over-pressure valve to be designed as a preassembled and encapsulated module.

The preassembly of the module (also referred to hereafter as the "cartridge") enables the respective function to be preset accurately at the factory, resulting in a high level of operational reliability alongside reproducible functionality. The encapsulation prevents unauthorized access to the cartridge and the predefined settings being changed, or makes these actions difficult. Sealing can be provided for inspection purposes.

In addition, it is easier, more reproducible, and more reliable to replace the preassembled module than to replace the module's individual components.

It has proved particularly beneficial for the preassembled module to feature a sealing cap, which provides visual information on the maintenance status.

When the module is maintained/inspected, the sealing cap must be removed in order to check the module is functioning correctly and to carry out any readjustment or resetting work, if necessary. The entire module can also be replaced as part of this procedure. Afterwards, the checked or replaced module is fitted with a sealing cover, for example, a blind cap, which shows the most recent maintenance/inspection status, similar to a decal from a technical inspectorate. The visual information can take the form of a colored year-specific ID or show the date, for example.

PREFERRED EMBODIMENTS

Figure 5:
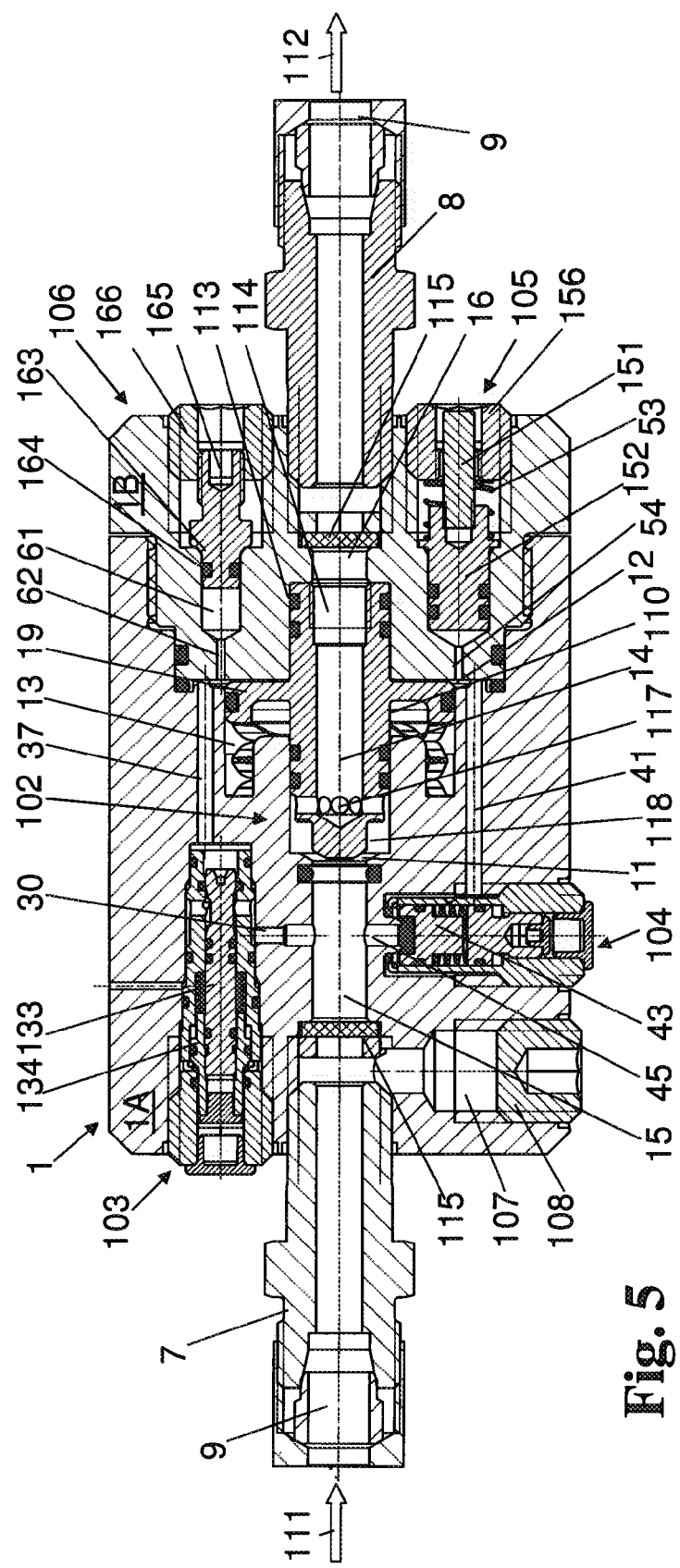
Figure 8:
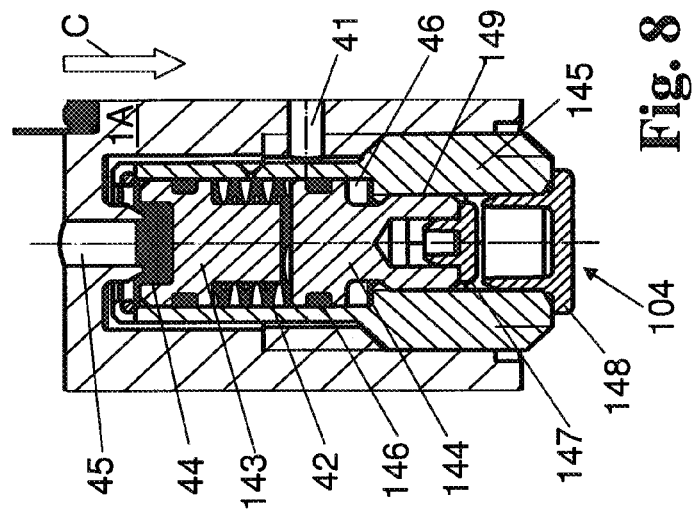
Figure 7:
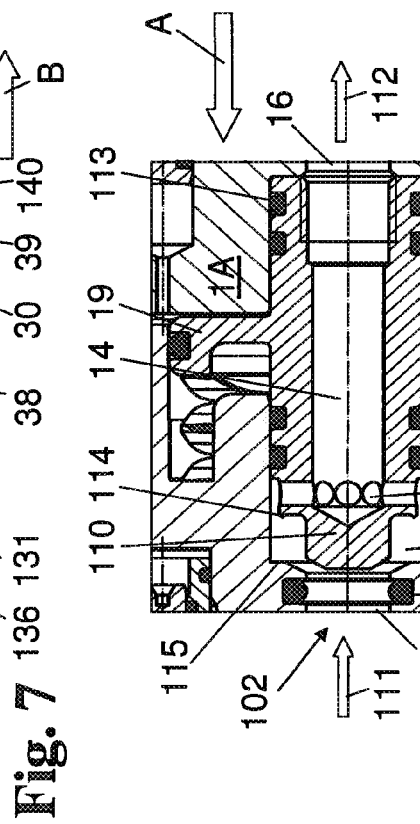
Figure 6:
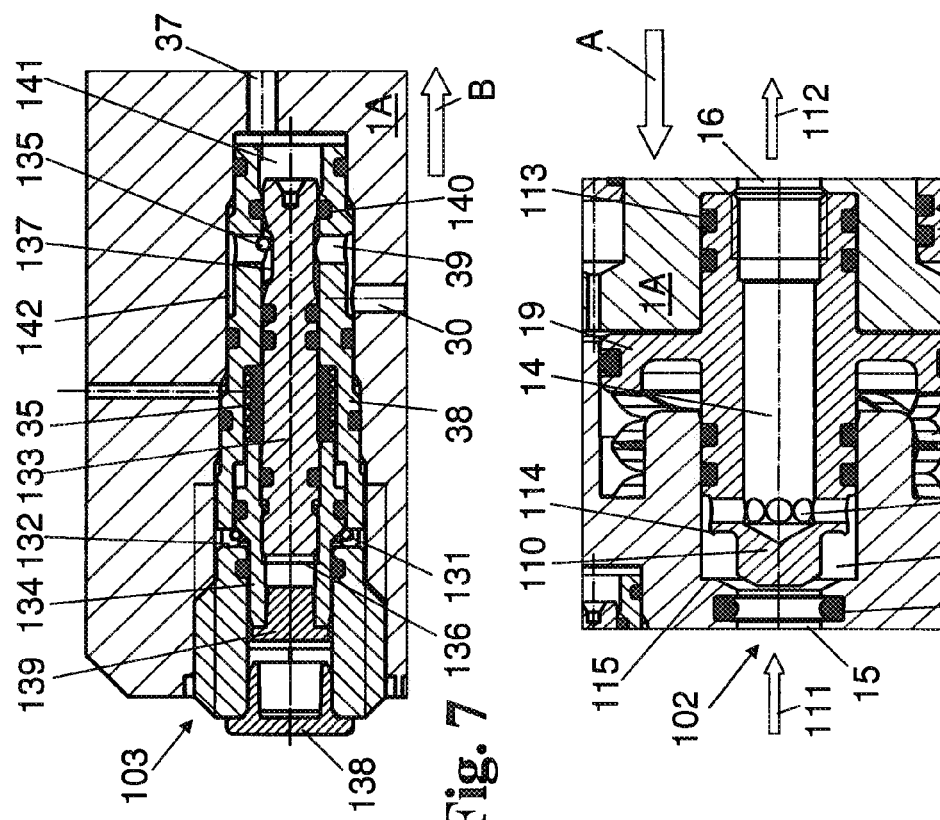

The invention is explained in more detail below by illustrative embodiments and a drawing. The drawing shows a schematically in:

FIG. 1 a first embodiment of the safety device invention in a longitudinal section, FIG. 2 a detail from FIG. 1 showing a larger depiction of the safety valve, FIG. 3 a detail from FIG. 1 showing a larger depiction of the control valve, FIG. 4 a detail from FIG. 1 showing a larger depiction of the over-pressure valve, FIG. 5 another embodiment of the safety device invention in a longitudinal section, FIG. 6 a detail from FIG. 5 showing a larger depiction of the safety valve, FIG. 7 a detail from FIG. 5 showing a larger depiction of the control valve, FIG. 8 a detail from FIG. 5 showing a larger depiction of the over-pressure valve, FIG. 9 the embodiment of the safety device invention from FIG. 5 with a view of the longitudinal side, FIG. 10 the embodiment of the safety device invention from FIG. 5 with a view of the front face, partially truncated, and FIG. 11 the embodiment of the safety device invention from FIG. 5 in a three-dimensional depiction.

EXAMPLE 1

The embodiment of the safety device depicted in FIG. 1 is designed for installation in the supply line of an acetylene system in which acetylene is drawn from cylinders or cylinder bundles. The safety device is designed as a multiple unit valve and is installed in the system's high-pressure area—upstream of the main pressure regulator.

The valve body 1 consists of a two-part, essentially monolithic brass block. Both block parts (housing 1A and housing cover 1B) are screwed together and sealed. Sealing elements are basically depicted in FIGS. 1 to 4 as black surface entities. The valve body 1 features a number of holes, which accommodate the following components: a safety valve 2 (stop valve), a control valve 3, an over-pressure valve 4, a display instrument 5, and a vent valve 6.

Safety Valve 2

The valve body 1 has a central through hole, into which the gas connections 7; 8, which serve to connect the safety device to the acetylene supply line, are screwed on both sides.

Between a gas inlet 15 and a gas outlet 16, the safety valve 2 is designed as a piston valve that opens with the inlet pressure. This valve is depicted in FIG. 1 and in larger form in FIG. 2. The safety-valve piston 10 is able to move in the axial direction within the safety-valve chamber between a valve-closed position and a valve-open position. FIG. 1 depicts the open position; the piston movement in the closing direction is indicated by block arrow A. In the closed position, the safety-valve piston 10 divides the safety-valve chamber into a front pressure chamber 11 and a rear pressure chamber 12.

The safety-valve piston 10 features a cavity 14, which is designed as a blind hole, opens into the gas outlet 16 on the side opposite to the flow, and is connected to the front pressure chamber 11 via four through cross holes 17. It is designed as a double piston, whose cylinder jacket features areas with two different external diameters. The area 19 with the maximum external diameter protrudes into a spring chamber, which is encapsulated by means of sealing rings against the ingress of acetylene or decomposition gases. A sinuous spring 13 rests against the top side of the surrounding area 19; this spring keeps the piston 10 in the open position during normal operation. The bottom side of this area 19 protrudes into the rear pressure chamber 12, where it has a comparatively large piston area. As a result, the safety-valve piston 10 has a larger effective cross-section to act against the gas pressure in the rear pressure chamber 12 than against the gas pressure in the front pressure chamber 11.

FIGS. 1 and 2 depict the safety valve 2 in the open position. As indicated by the two direction arrows, the acetylene gas coming from the inlet-pressure gas inlet 15 flows into the front pressure chamber 11, through the cross holes 17 into the cavity 14, and from there to the inlet-pressure gas outlet 16 unimpeded.

If the safety valve 2 is closed, a sealing ring 18 fitted to the front piston end of the safety-valve piston 10 rests against the inner wall of the safety-valve chamber, thus sealing the cross holes 17 off from the front pressure chamber 11. The different effective cross-sections in the front and rear pressure chambers 11; 12 ensure that the safety-valve piston 10 is always brought into and held in the closed position when the pressures in the respective pressure chambers 11; 12 are at the same level. The pressure prevailing in the rear pressure chamber 12 always acts as the holding force here. This pressure is always the inlet pressure, as explained in more detail below.

If the safety valve 2 is closed, the supply of further acetylene gas is interrupted. The safety valve 2 closes if either the control valve 3 or the over-pressure valve 4 is open. The safety valve 2 also closes if there is a pressure rise originating on the side of the gas outlet 8, as can occur if acetylene decomposes in the relevant gas line between the safety device and the main pressure regulator, for example. In this respect the safety valve 2 also acts as a non-return valve.

Control Valve 3

The control valve 3 is inserted in another hole in the valve body 1. This hole runs parallel to the middle hole for the safety valve 2.

The control valve 3 is depicted in FIG. 1 and in larger form in FIG. 3. It is part of a limiting device for the outlet pressure, which is set to 1.5 bar by default. The control valve 3 serves to interrupt the supply of acetylene if the main pressure regulator indicates a significant deviation or a defect, which manifests itself as a gradual or sudden increase in the outlet pressure. The limit value is defined as 20% above the target value, i.e., 1.8 bar. The control valve 3 opens above this pressure.

To this end, acetylene gas at outlet pressure is fed to the control valve 3 from the outlet-pressure area of the main pressure regulator through a bypass line symbolized by the direction arrow, which ends at the elbow fitting 31. In its normal condition, the control valve 3 is closed. In this state the gas pressure applied at the outlet-pressure gas inlet 32 for the acetylene gas is not sufficient to move the control-valve piston 33 in the opening direction against the pressure of a sinuous spring 34 resting against the opposite end. The piston movement in the opening direction is indicated by block arrow B.

Similar to the safety-valve piston 10, the control-valve piston 33 also features a cavity 35, which is designed as a blind hole and leads to the piston outer wall through the cross holes 36. The cavity 35 is fluidically connected to the rear pressure chamber 12 of the safety valve 2 via a pressure-compensation line 37. The cross holes 36 reach the piston outer wall at a longitudinal section, which is closed off from the outside if the control valve 3 is closed, thanks to sealing rings fitted on both sides. When the control-valve piston 33 moves in the opening direction, the longitudinal section concerned finally aligns with the sealed cross holes 39 of the valve sleeve 38. This opens the control valve 3. Inlet pressure is constantly applied at the cross hole 39, since it is fluidically connected to the front pressure chamber 11 via the other pressure-compensation line 30 and the gas inlet 15.

If the outlet pressure exceeds the preset limit value of 1.8 bar, the control valve 3 opens the fluidic connection to the front pressure chamber 11 of the safety-valve chamber, so acetylene gas at inlet pressure flows into the cavity 35 of the control-valve piston 33 and from there through the pressure-compensation line 37 to the rear pressure chamber 12 of the safety-valve chamber, which causes the safety valve 2 to close straightaway, as explained above.

If the control valve 3 is open, so too are the pressure-compensation lines 30; 37, which are connected to one another via the control-valve piston 33. This ensures that the front pressure chamber 11 and the rear pressure chamber 12 are at the same pressure, i.e., the inlet pressure, so the safety valve 2 closes.

Over-Pressure Valve 4

The over-pressure valve 4 is also inserted in a hole in the valve body, which runs perpendicular to the middle hole. The over-pressure valve 4 is depicted in FIG. 1 and in larger form in FIG. 4. It is part of the automatic quick-action shut-off device. The operating pressure (inlet pressure) in the acetylene supply line is between 4 and 25 bar, depending on the fill level of the acetylene container. The over-pressure valve 4 serves to interrupt the acetylene gas flow as soon as the inlet pressure exceeds the maximum operating pressure by 20%, i.e., 30 bar.

To this end, the over-pressure valve 4 features an over-pressure chamber 46, inside which a sinuous spring 42 presses a slide valve 43, which is able to move in the axial direction, with a sealing lip 44 against an opening, thus closing it. The current prevailing inlet pressure of the acetylene gas is constantly applied at this opening through a pressure-compensation line 45 that is connected to the inlet-pressure gas inlet 15.

FIGS. 1 and 4 depict the closed position; the piston movement in the opening direction is indicated by block arrow C. If the over-pressure valve 4 is open, acetylene gas at the current inlet pressure flows through a pressure-compensation line 41 to the rear pressure chamber 12, thus closing the safety valve 2.

The slide valve 43 has a larger effective pressure cross-section on its side facing the over-pressure chamber than on its other side, so combined with the spring force of the sinuous spring 42, this results in a force acting in the closing direction. This ensures that the over-pressure valve 4 is only open temporarily.

Even if the inlet pressure rises still further, the safety valve 2 should always remain closed; the over-pressure valve 4, on the other hand, can open. The design achieves this through the spring forces of the respective sinuous springs 13; 42 and the difference between the effective pressure faces of the respective closing pistons 10; 19; 43 acting in the closing direction. Overall the over-pressure valve 4 and the safety valve 2 are coordinated with one another such that, if the safety valve 2 is closed, the forces acting on the safety-valve piston 10 (or, more precisely, on the larger diameter area 19) in the closing direction are greater than the forces acting on the slide valve 43 in the closing direction.

In normal operation, therefore, the over-pressure valve 4 and the control valve 3 are closed; the safety valve 2 is open and allows gas to flow unimpeded. However, the safety valve 2 shuts off the acetylene supply line as soon as either the over-pressure valve 4 or the control valve 3 opens. Therefore, it fulfills the specifications for a pressure-controlled shut-off valve as per EN ISO 14114:1999, Annex B, the standard specifications for an automatic quick-action shut-off device as per EN ISO 1411:1999, Section 3.6.2, and for a pressure-limiting device as per EN ISO 14114:1999, Section 3.7.

Vent Valve 6

If the safety valve 2 is closed due to the limit value for the outlet pressure or the limit value for the inlet pressure being exceeded, it is not possible to continue using the safety device without taking further steps.

In this condition, the rear pressure chamber 12 is pressurized. A vent valve 6 is provided in the valve body 1 for ventilation purposes. The vent valve 6 is inserted in another hole in the valve body 1, which runs parallel to the middle hole. It features a vent-valve chamber 61, which is connected to the rear pressure chamber 12 via a pressure-compensation line 62. The vent-valve chamber 61 is closed by means of a cap 63 with a sealing lip 64. This cap can be pushed in the direction of the vent-valve chamber 61 using a set screw 66 (to the left as depicted in FIG. 1). This causes the vent-valve chamber 61 to open, so the pressurized acetylene gas is able to discharge from the vent-valve chamber 61, as well as from all lines and cavities fluidically connected to it, and from the rear pressure chamber 12 in particular. Once the set screw 66 has been loosened, the restoring force of a spring 65 brings the cap 63 back to its initial position, so the vent valve 6 is closed again.

This ventilation causes the safety-valve piston 10 to move back into its initial position due to the gas pressure applied in the front pressure chamber 11 and assisted by the compression spring 13, so the safety valve 2 is once again open and ready for operation.

Activation Indicator 5

The valve body 1 also contains a hole to accommodate the activation indicator 5. This hole runs parallel to the middle hole. The activation indicator 5 shows that a fault is present. To this end, a colored indicator pin 51 with a foot 52, which is sealed off from the inner wall and rests against the base of the hole, is incorporated in the hole. The base of the hole is connected to the rear pressure chamber 12 via a pressure-compensation line 54.

If the safety valve 2 is closed, the rear pressure chamber 12 is pressurized. This pressure is propagated via the pressure-compensation line 54 to the base of the hole of the display element 5, which causes the indicator pin 51 to be pushed out of the hole against the force of a return spring 53 resting against the foot 52 (to the right as depicted in FIG. 1). Once the fault has been rectified and ventilation carried out via the vent valve 6, the indicator pin 51 sinks back into the hole automatically thanks to the return spring 53.

EXAMPLE 2

An embodiment of the safety device invention modified from that depicted in FIG. 1 is explained below based on FIGS. 5 to 11. As can be seen from the figures, this embodiment features a number of sealing rings arranged in pairs, whereby one of the two sealing rings in each case serves as the "sacrificial ring". If this ring is destroyed through acetylene decomposition, the other sealing ring continues to guarantee the sealing function. Furthermore, some of the single valve units integrated in the valve body 1 have been designed as preassembled, self-contained units, or "cartridges", which can be fitted and set at the factory.

These and other differences will be explained in more detail below. Inasmuch as the same reference numbers are used as in FIGS. 1 to 4, they refer to the same or equivalent components or parts of the safety device as have already been explained for the embodiment described in Illustration 1.

The safety device is designed for installation in the supply line of an acetylene system in which acetylene is drawn from cylinders or cylinder bundles. The safety device is designed as a multiple unit valve and is installed in the system's high-pressure area—upstream of the main pressure regulator.

Here too, the valve body 1 consists of a two-part, essentially monolithic and cylinder-shaped brass block with two block parts (housing 1A and housing cover 1B) that are screwed together and sealed. Sealing elements are depicted as black surface entities in this instance too. Both the housing 1A and the housing cover 1B feature holes, which accommodate the following components: a safety valve 102 (stop valve), a control valve 103, and an over-pressure valve 104 in the housing 1A, and a display instrument 105 and a vent valve 106 in the housing cover 1B.

Safety Valve 102

The valve body 1 has a central through hole, into which the gas connections 7; 8, which serve to connect the safety device to the acetylene supply line, are screwed on both sides. On the embodiment depicted in FIG. 5, the gas connections 7; 8 are arranged in a straight configuration. The valve body 1 contains a connection hole 107, closed by a dummy plug 108, for an alternative, angled arrangement. Therefore, the safety device can either be installed in the straight-line or angled connection variant, depending on the on-site conditions.

Between a gas inlet 15 and a gas outlet 16, the safety valve 102 is designed as a piston valve that opens with the inlet pressure. This valve is depicted in FIG. 5 and in larger form in FIG. 6. The safety-valve piston 110 is able to move in the axial direction within the safety-valve chamber between a valve-closed position and a valve-open position. FIG. 5 depicts the open position; the piston movement in the closing direction is indicated in FIG. 6 by block arrow A. In the closed position, the safety valve piston 110 divides the safety-valve chamber into a front pressure chamber 11 and a rear pressure chamber 12.

The safety-valve piston 110 features a cavity 14, which is designed as a blind hole, opens into the gas outlet 16 on the side opposite to the flow, and is connected to the front pressure chamber 11 via a number of through cross holes 117. It is designed as a double piston, whose cylinder jacket features areas with two different external diameters. The area 19 with the maximum external diameter protrudes into a spring chamber, which is encapsulated by means of sealing rings against the ingress of acetylene or decomposition gases. A sinuous spring 13 rests against the top side of the surrounding area 19; this spring keeps the piston 110 in the open position during normal operation. The bottom side of this area 19 protrudes into the rear pressure chamber 12, where it has a comparatively large piston area. As a result, the safety-valve piston 110 has a larger effective cross-section to act against the gas pressure in the rear pressure chamber 12 than against the gas pressure in the front pressure chamber 11.

The outer jacket of the piston 110 is sealed off from the hole of the valve body 1 by means of O-rings on both sides of the larger diameter area 19. These O-rings are integrated in grooves on the piston 110 and arranged in pairs, whereby one of the O-rings in each case serves as the "sacrificial O-ring". The sacrificial O-ring is the one exposed to the decomposition conditions first in the event of acetylene decomposition, where pressures can reach over 1000 bar and high temperatures can occur. In the case of the O-ring pair on the side opposite to the flow, for example, this is the O-ring identified by reference number 113; if acetylene decomposes in the gas line between the safety device and the main pressure controller, this O-ring will be the first to be subjected to the flow-back of decomposition products.

FIGS. 5 and 6 depict the safety valve 102 in the open position. As indicated by the two direction arrows 111 and 112, the acetylene gas coming from the inlet-pressure gas inlet 15 flows into the front pressure chamber 11, through the cross holes 117 into the cavity 14, and from there to the inlet-pressure gas outlet 16 unimpeded.

If the safety valve 102 is closed, the front piston end of the safety-valve piston 110 rests against a sealing ring 118, which is embedded in a groove running all around the inner wall of the gas inlet 15. The sealing ring 118 which is integrated in the valve body 1 in this way remains fixed in the groove even under high mechanical stress.

As an additional protective measure the safety-valve piston 110 features a metallic sealing band 114 (FIG. 6) running all the way around, which is located in a piston face recess and points in the closing direction A. If acetylene decomposition occurs, the end of the piston 110 strikes the sealing ring 118 and the sealing band 114 strikes the sealing face 115 of the valve housing 1 simultaneously to create a tight metallic contact surface, which continues to function as a seal even if the sealing ring 118 fails and interrupts or at least significantly reduces the supply of further acetylene gas.

In the closed state, the cross holes 117 are sealed off from the front pressure chamber 11. The different effective cross-sections in the front and rear pressure chambers 11; 12 ensure that the safety-valve piston 110 is brought into and held in the closed position. The pressure prevailing in the rear pressure chamber 12 acts as the maximum holding force here. This pressure is the inlet pressure, as explained in more detail below.

If the safety valve 102 is closed, the supply of further acetylene gas is interrupted. The safety valve 102 closes if either the control valve 103 or the over-pressure valve 104 is open. The safety valve 102 also closes if there is a pressure rise originating on the side of the gas outlet 8, as can occur if acetylene decomposes in the relevant gas line between the safety device and the main pressure regulator, for example. In this respect the safety valve 102 also acts as a non-return valve.

To make it easier to take a blocked safety valve 102 out of the valve housing 1, the output-side end of the piston 110 features an internal thread 114. To reduce the risk of solid decomposition products, such as chips, entering the safety valve 102 and, in particular, the sealing area of the sealing rings, noble-metal filter disks 115 are installed upstream of the gas inlet 15 and the gas outlet 16.

Control Valve 103

The control valve 103 has been designed as a preassembled, self-contained module preset at the factory, which may also be referred to as a "control-valve cartridge". The control-valve cartridge is inserted in another hole in the valve body 1. This hole runs parallel to the middle hole for the safety valve 102.

The control valve 103 is depicted in FIG. 5 and in larger form in FIG. 7. It is part of a limiting device for the outlet pressure. The control valve 103 serves to interrupt the supply of acetylene if the main pressure regulator indicates a significant deviation from the nominal pressure or a defect, which manifests itself as a gradual or sudden increase in the outlet pressure.

The level of the outlet pressure corresponds to the nominal pressure at the consumer. In low-pressure applications this is 0.8 bar, in medium-pressure applications 1.2 bar, and in high-pressure applications 1.5 bar. The activation limit pressure for the control valve 103 is around 20% above the respective nominal value and is preset at the factory, for example, to 1.5 bar for the medium-pressure range. However, the activation limit pressure can also be readjusted during operation, as is explained in more detail further below.

Acetylene gas at outlet pressure is fed to the control valve 103 from the outlet-pressure area of the main pressure regulator through a bypass line. The bypass line connected to the control valve 103 via the jacket surface of the valve body 1 and can be seen in FIGS. 9, 10, and 11 as the lateral screwed connection 130. This connection opens into an outlet-pressure gas compartment 132 inside the control-valve cartridge (103), which can be seen in FIG. 7 as a narrow cavity sealed on both sides and which contains a circlip 131.

In its normal condition, the control valve 103 is closed. In this state the gas pressure applied at the outlet-pressure gas compartment 132 for the acetylene gas is not sufficient to move the control-valve piston (133; 134) in the opening direction against the pressure of a sinuous spring 34 resting against it. The piston movement in the opening direction is indicated by block arrow B.

The control-valve cartridge is sealed to the outside by means of a blind cap 138 and a plug 139, which is installed in a piston head 134 designed with a hexagon socket. The plug 139 is intended to make unauthorized access to the control-valve cartridge difficult and to prevent unintended changes being made to settings. The blind cap 138 is sealed with a test seal and color-coded, whereby its color indicates the current inspection status (for example, the most recent year of inspection).

The activation limit pressure of the control valve 103 can be corrected or set to a different value. To this end, the control-valve piston is divided into two parts: a piston head 134 and a piston rod 133, which are connected to one another via a thread 136. The overall length of the control-valve piston (133; 134) can be modified using this threaded connection 136. If the control-valve piston (133; 134) is lengthened, the stroke for activating the valve shortens and, conversely, the stroke lengthens if the piston (133; 134) is shortened.

To adjust the activation limit pressure of the control valve 103, the blind cap 138 and the plug 139 are removed and the hexagon socket which then becomes accessible is used to turn the thread 136 between the piston rod 133 and the piston head 134. This adjustment can also be made during operation, since the accessible area of the hexagon socket is sealed off from the rest of the valve chamber by an O-ring. The piston rod 133 features a lateral flat surface 137, against which a pin 135 rests. This prevents the piston rod 133 from being turned as well when the threaded connection 136 is actuated.

FIGS. 5 and 7 depict the control valve 103 in the closed position. The valve sleeve 38 features the cross holes 39, which are sealed on both sides. One of these seals is realized via an O-ring 140 inserted in a groove on the valve sleeve 38; this O-ring rests against a longitudinal section of the piston rod 133 adjacent to the flat-surface area. The cross holes 39 themselves are located in the flat-surface area 137 of the piston rod 133 and are connected to a pressure-compensation line 30 via a profiled area 142 of the piston rod 133. Inlet pressure is constantly applied at this line, as it is fluidically connected to the front pressure chamber 11 via the gas inlet 15.

A rear gas compartment 141 is located at the output-side end of the piston rod 133; this compartment is connected to the rear pressure chamber 12 of the safety valve 102 via another pressure-compensation line 37.

The outlet-pressure gas compartment 132 is sealed gas-tight from the pressure-compensation line 30 and from the pressure-compensation line 37 by means of O-rings. If the control valve 103 is closed, the fluidic connection between the aforementioned pressure-compensation lines 30 and 37 is broken. When the piston rod 133 moves in the opening direction (direction arrow B), however, the chamfer facing the flat surface 137 of the piston rod 133 extends into the sealing area of the O-ring 140. The O-ring 140 is not able to seal the chamfered area and the flat surface 137, so the aforementioned pressure-compensation lines 30 and 37 are connected to one another and, as a result, the control valve 103 is open.

If the outlet pressure in the outlet-pressure gas compartment 132 exceeds the preset limit value, the control valve 103 opens the fluidic connection to the front pressure chamber 11 of the safety-valve chamber, so acetylene gas at inlet pressure flows into the cavity 141 and from there through the pressure-compensation line 37 to the rear pressure chamber 12 of the safety-valve chamber, which causes the safety valve 102 to close straightaway, as explained above.

It the control valve 103 is open, so too are the pressure-compensation lines 30; 37, which are connected to one another via the control-valve piston 133. This ensures that the front pressure chamber 11 and the rear pressure chamber 12 are at the same pressure, i.e., the inlet pressure, so the safety valve 102 closes.

Over-Pressure Valve 104

The over-pressure valve 104 has also been designed as a preassembled, self-contained module preset at the factory, which may also be referred to as an "over-pressure-valve cartridge". The over pressure-valve cartridge is inserted in a hole in the valve body 1, which runs perpendicular to the middle hole for the safety valve 102. The over-pressure valve 104 is depicted in FIG. 5 and in larger form in FIG. 8. It is part of the automatic quick-action shut-off device.

The operating pressure (inlet pressure) in the acetylene supply line is between 4 and 25 bar, depending on the fill level of the acetylene container. The over-pressure valve 104 serves to interrupt the acetylene gas flow as soon as the inlet pressure exceeds the maximum operating pressure by 20%. The activation limit pressure is preset at the factory to 30 bar, for example, but it can also be adjusted or readjusted when pressurized.

To this end, the over-pressure-valve piston is designed as a two-part component consisting of a piston valve 143 and a master piston 144. A sinuous spring 42 is installed between these components (143; 144). The master piston 144 is screwed into the over-pressure-valve piston pin bushing 145 by means of a thread 149 and features a hexagon socket on its end face which can be accessed from above. The hexagon socket is sealed to the outside by a plug 147, with the over-pressure-valve cartridge (104) being sealed by a blind cap 148 in addition. The color of the blind cap 148 indicates the current maintenance or inspection status, as has already been explained above in relation to the control valve 103. Once the blind cap 148 and the plug 147 have been removed, the hexagon socket of the master piston 144 can be accessed. Turning this socket enables the spring bias of the sinuous spring 42 to be changed and, consequently, the activation limit pressure to be corrected or reset.

The over-pressure valve 104 usually features an over-pressure chamber 46 sealed by an O-ring 146. The piston valve 143 with sealing lip 44, which permits movement in the axial direction, acts against the pressure of the sinuous spring 42 to press against and close an opening. The current prevailing inlet pressure of the acetylene gas is constantly applied at this opening through a pressure-compensation line 45 that is connected to the inlet-pressure gas inlet 15.

FIGS. 5 and 8 depict the closed position; the piston movement in the opening direction is indicated by block arrow C. If the over-pressure valve 104 is open, acetylene gas at the current inlet pressure flows through a pressure-compensation line 41 to the rear pressure chamber 12, thus closing the safety valve 102.

The piston valve 143 has a larger effective pressure cross-section on its side facing the over-pressure chamber 45 than on its other side, so combined with the spring force of the sinuous spring 42, this results in a force acting in the closing direction. This ensures that the over-pressure valve 104 is only open temporarily.

Even if the inlet pressure rises still further, the safety valve 102 should always remain closed; the over-pressure valve 104, on the other hand, can open. The design achieves this through the spring forces of the respective sinuous springs 13; 42 and the difference between the effective pressure faces of the respective closing pistons 10; 19; 43 acting in the closing direction.

Overall the over-pressure valve 104 and the safety valve 102 are coordinated with one another such that, if the safety valve 102 is closed, the forces acting on the safety-valve piston 110 (or, more precisely, on the larger diameter area 19) in the closing direction are greater than the forces acting on the slide valve 43 in the closing direction.

In normal operation, therefore, the over-pressure valve 104 and the control valve 103 are closed; the safety valve 102 is open and allows gas to flow unimpeded. However, the safety valve 102 shuts off the acetylene supply line as soon as either the overpressure valve 104 or the control valve 103 opens. Therefore, it fulfills the specifications for a pressure-controlled shut-off valve as per EN ISO 14114:1999, Annex B, the standard specifications for an automatic quick-action shut-off device as per EN ISO 1411:1999, Section 3.6.2, and for a pressure-limiting device as per EN ISO 14114:1999, Section 3.7.

Vent Valve 106

If the safety valve 102 is closed due to the limit value for the outlet pressure or the limit value for the inlet pressure being exceeded, it is not possible to continue using the safety device without taking further steps.

In this condition, the rear pressure chamber 12 is pressurized. A vent valve 106 is provided in the valve body 1 for ventilation purposes. The vent valve 106 is inserted in another hole in the valve body 1, which runs parallel to the middle hole of the safety valve 102, it features a vent-valve chamber 61, which is connected to the rear pressure chamber 12 via a pressure-compensation line 62. A threaded insert 163, which features a groove in which an O-ring 164 is located, protrudes into the vent-valve chamber 61 and seals it to the outside. The threaded insert 163 is screwed into the hole of the valve body 1, where it comes to rest on a wall running all the way around the valve body 1 and through this contact forms a metallic seal in addition to the seal created by the O-ring 164. The end of the threaded insert 163 which points outward features a hexagon socket 165 and another external thread onto which a threaded plug 166 with a through hole is screwed. The threaded plug 166 also has an external thread, which enables it to be screwed into the hole of the valve body 1.

The threaded insert 163 can be screwed out of the vent-valve chamber 61 using the hexagon socket 165 (to the right as depicted in FIG. 5). If the O-ring 164 moves out of its position, this causes the vent-valve chamber 61 to open, so the pressurized acetylene gas is able to discharge from the vent-valve chamber 61, as well as from all lines and cavities fluidically connected to it, and from the rear pressure chamber 12 in particular. Screwing the threaded insert 163 into the hole as far as it will go brings the O-ring 164 and the metallic seal back into their sealing positions, so the vent valve 106 is closed again.

This ventilation causes the safety-valve piston 110 to move back into its initial position due to the gas pressure applied in the front pressure chamber 11 and assisted by the compression spring 13, so the safety valve 102 is once again open and ready for operation.

Activation Indicator 105

The valve body 1 (or, more precisely, the housing cover 1B) also contains a hole to accommodate the activation indicator 105. This hole runs parallel to the middle hole for the safety valve 102. The activation indicator 105 shows that a fault is present. To this end, a brass piston 152 is inserted into the hole; this piston works in conjunction with a colored plastic indicator pin 151. On one side the indicator pin 151 is inserted into a blind hole on the brass piston 152, which runs coaxially to the brass piston's longitudinal axis, and on the other side it leads into the through hole of a threaded plug 156. The threaded plug 156 has an identical construction to the threaded plug 166 of the vent valve 106 and, like this, has an external thread, which enables it to be screwed into the hole of the valve body 1.

The outer jacket surface of the brass piston 152 is sealed off from the inner wall of the hole in the valve body 1 by means of a pair of O-rings (with a sacrificial O-ring). The base of the hole is connected to the rear pressure chamber 12 via a pressure-compensation line 54.

If the safety valve 102 is closed, the rear pressure chamber 12 is pressurized. This pressure is propagated via the pressure-compensation line 54 to the base of the hole of the display element 105, which causes the brass piston 152 together with the indicator pin 151 to be pushed out of the hole against the force of a return spring 53 (to the right as depicted in FIG. 5). Once the fault has been rectified and ventilation carried out via the vent valve 106, the brass piston 152 and the indicator pin 151 sink back into the hole automatically thanks to the return spring 53.

FIG. 9 depicts a longitudinal view of the embodiment of the safety device invention according to Illustration 2 with the two-part valve body 1, the gas connections 7 and 8 on both sides for connecting the safety device to the acetylene supply line, and the gas connection 130 for the outlet-pressure bypass line to the control valve 103.

The front view shown in FIG. 10 also depicts a broken-out section with details of the gas connection 130 which joins the jacket surface of the valve body 1 for the outlet-pressure bypass line, as well as the blind cap 138 of the control valve 103.

The three-dimensional depiction of the safety device shown in FIG. 11 also shows the blind cap 148 of the over-pressure valve 104, as well as the dummy plug 108 for an alternative, angled gas connection 7.

The invention claimed is:

1. A safety device for installation in a gas-supply system, where a main pressure regulator relieves regulates an inlet pressure of a gas fed thereto to an outlet pressure, said safety device comprising:
   a valve body to which the gas is fed at the inlet pressure and from which the gas is fed at the outlet pressure;
   an over-pressure valve of a quick-action shut-off device, said over-pressure valve being configured to open responsive to the inlet pressure being above a predetermined inlet-pressure limit value;
   a control valve of a pressure-limiting device, said control valve being configured to open responsive to the outlet pressure being above a predetermined outlet-pressure limit value, and a safety valve fluidically connected to the over-pressure valve and the control valve; and
   wherein the safety valve closes either when the over-pressure valve opens due to the inlet pressure being at an inlet pressure level that is above the inlet-pressure limit value, or when the control valve opens due to the outlet pressure being at an outlet pressure level that is above an outlet-pressure limit value;
   wherein the safety valve has an inlet-pressure gas inlet, an inlet-pressure gas outlet, and a safety-valve chamber therebetween;
   said chamber being configured to be closed via a safety-valve closing element that is supported so as to be movable inside the chamber in an axial direction and such that the safety-valve closing element moves such that the safety valve opens with the inlet pressure;
   said chamber being divided into a front pressure chamber and a rear pressure chamber:
   wherein the safety-valve closing element protrudes into the front pressure chamber facing the inlet-pressure gas inlet with a first effective cross-section;
   wherein the safety-valve closing element protrudes into the rear pressure chamber facing the inlet-pressure gas outlet with a second effective cross-section that is larger than the first effective cross section, and
   the rear pressure chamber and the front pressure chamber are both configured to be fluidically connected to the over-pressure valve and the control valve via pressure-compensation lines;
   wherein the safety-valve closing element is a safety-valve piston;
   wherein the safety-valve piston has a piston wall sealed off from the safety-valve chamber; and
   wherein the safety-valve piston has a cavity with at least one cross hole that extends through the piston wall and into an area that is connected to the front pressure chamber when the safety valve is open and that is sealed off from the front pressure chamber when the safety valve is closed.

2. The safety device as claimed in claim 1, wherein the control valve is connected to the safety valve via a pressure-compensation line and
   wherein gas flows through the pressure-compensation line into the control valve at the inlet pressure when the control valve is open, causing the safety valve to close.

3. The safety device as claimed in claim 1, wherein the control valve has an outlet-pressure gas inlet for the gas, and
   wherein the outlet-pressure gas inlet is connected to a control-valve chamber closed against the outlet-pressure gas inlet up to the outlet-pressure limit value with a control-valve closing element that is supported so at be movable inside the chamber in an axial direction,
   wherein, when the control valve is open, the pressure-compensation lines are open and fluidically connect the control-valve chamber to the front pressure chamber and the rear pressure chamber.

4. The safety device as claimed in claim 1, wherein the control-valve closing element is a control-valve piston that moves inside the chamber, and
   wherein the control-valve piston has a piston wall sealed off from the control-valve chamber, and
   wherein the control-valve piston has a cavity that is fluidically connected to the rear pressure chamber and has at least one cross hole that extends through the piston wall and into an area that is sealed when the control valve is closed and fluidically connected to the front pressure chamber when the control valve is open.

5. The safety device as claimed in claim 4, wherein when the control valve is open, a pressure acting in a closing direction has a larger effective cross-section than a pressure acting in an opening direction.

6. The safety device as claimed in claim 1, wherein the over pressure valve has an over-pressure chamber connected to the inlet-pressure gas inlet and
   wherein the chamber has an over-pressure-chamber opening that is closed with a closing element that is able to move in an axial direction thereof and is fluidically connected to the rear pressure chamber via a pressure-compensation line.

7. The safety device as claimed in claim 6, wherein the closing element is pressed against the over-pressure-chamber opening by a spring located in the over-pressure chamber, and
   wherein the closing element has a larger effective pressure cross-section on a side thereof facing the over-pressure chamber than on an opposite side thereof.

8. The safety device as claimed in claim 6, wherein the safety-valve closing element is a piston, and
   wherein the over-pressure valve and the safety valve are coordinated with one another such that, if the safety valve is closed, the forces acting on the safety-valve piston in a closing direction are greater than the forces acting on the closing element in the closing direction.

9. The safety device as claimed in claim 1, wherein the valve body incorporates a vent valve, and
   wherein the vent valve has a vent-valve chamber that is closed via a closing element that can be mechanically actuated and moved in the axial direction, and the vent-valve chamber is fluidically connected to the rear pressure chamber via a pressure compensation line.

10. The safety device as claimed in claim 9, wherein the closing element can be moved by a threaded bolt.

11. The safety device as claimed in claim 1, wherein the valve body has a display instrument with a hole containing an inspection element that is positioned on bearings that permit movement in an axial direction thereof,
    wherein the inspection element seals the hole, and
    wherein a display pressure chamber is located at the base of the hole said display pressure chamber being fluidically connected to the rear pressure chamber via a pressure line.

12. The safety device as claimed in claim 1, wherein the control valve or the over-pressure valve is a preassembled, encapsulated module.

13. The safety device as claimed in claim 12, wherein the preassembled module has a sealing cap that provides visual information on the maintenance status.

14. The safety device as claimed in claim 1, wherein the control-valve closing element is a control-valve piston that moves inside the chamber.

* * * * *